Dec. 15, 1936.  B. A. BRICE  2,064,517
PHOTOELECTRIC CELL CIRCUIT
Filed Feb. 13, 1936
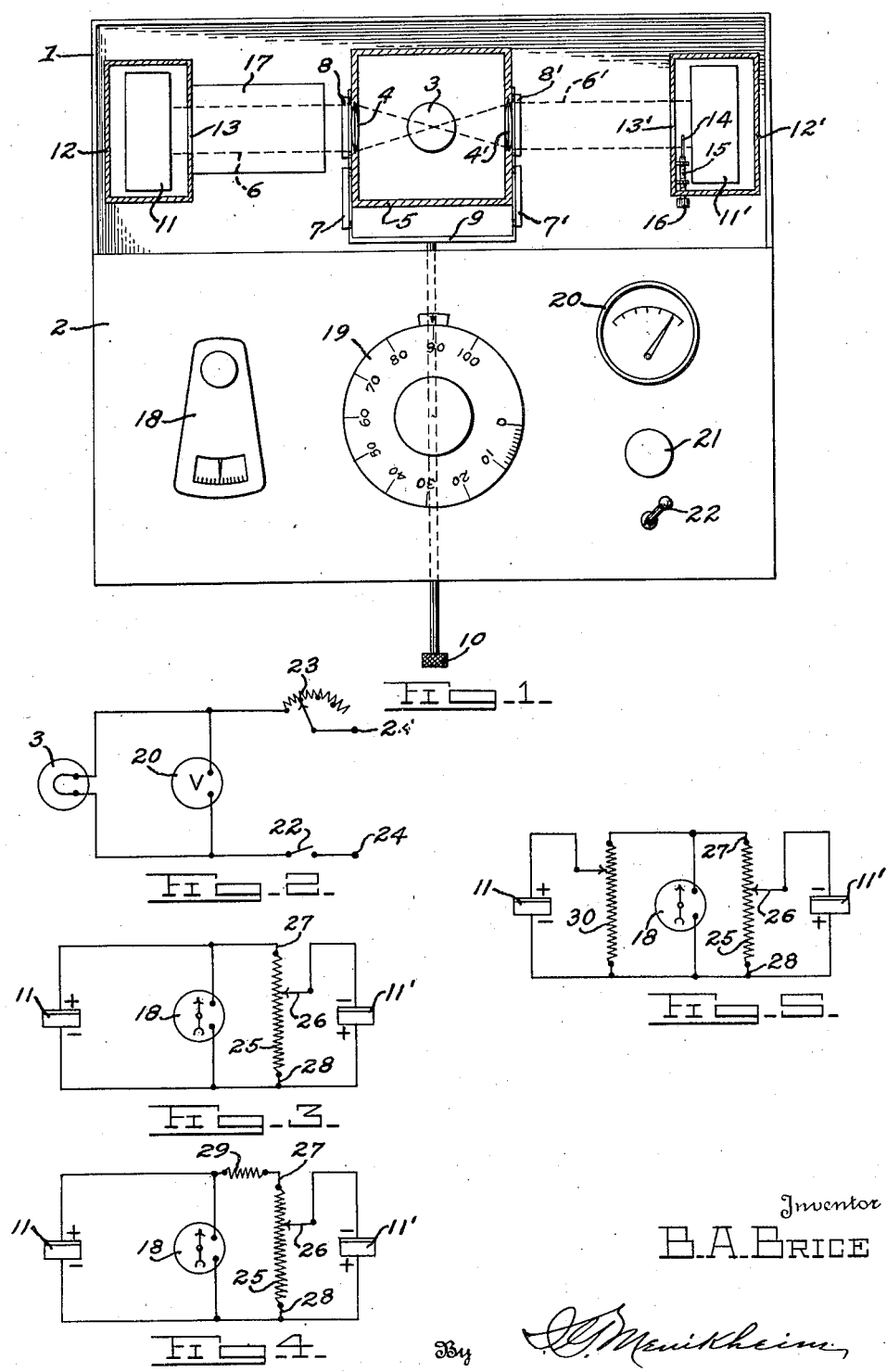
Inventor
B. A. BRICE
By
Attorney Patented Dec. 15, 1936

2,064,517

UNITED STATES PATENT OFFICE 2,064,517

PHOTOELECTRIC CELL CIRCUIT

Brooks A. Brice, Washington, D. C., assignor to Henry A. Wallace, Secretary of Agriculture of the United States of America Application February 13, 1936, Serial No. 63,745

6 Claims. (Cl. 250—41.5)

(Granted under the act of March 3, 1883, as amended April 30, 1928; 370 O. G. 757)

This application is made under the act of March 3, 1883, as amended by the act of April 30, 1928, and the invention herein described and claimed may be manufactured and used by or for the Government for governmental purposes without the payment to me of any royalty thereon.

My invention relates to photometric apparatus, and particularly to photometric apparatus employing two photoelectric cells arranged in a compensating circuit, with means for electrically balancing the circuit, means for indicating such balance, and means for taking readings.

An object of my invention is to provide an apparatus suitable for rapid and precise determinations of the transmission or reflection of light by transparent, translucent or opaque substances.

Another object of my invention is to provide such an apparatus which is compact, rugged, portable, and easy to operate, so that it can be used by persons unskilled in photometry or electricity.

Another object of my invention is to accomplish direct reading of the percent light transmission or reflection of a sample by means of a uniform scale attached to the device used for electrically balancing the circuit, without recourse to any of the various optical or mechanical devices available for measuring relative intensities of light. Many of such optical or mechanical devices, aside from being expensive, are open to objection because of wastefulness of light, difficulty of calibration, selectivity of transmission, critical alinement of parts, or because of necessity for uniform cross-section of light beams.

The direct reading of transmission or reflection is of great advantage when applied to many problems in colorimetry because of the universal definition of the terms transmission and reflection as the ratio of the light intensity incident on the object to the light intensity transmitted or reflected by the object. A scale which reads percent transmission of light or percent reflection of light for a given specimen is free from arbitrary interpretation.

My invention consists in certain electrical circuits and combinations of parts, as illustrated in the accompanying drawing, in which:

Figure I is a diagrammatic view partly in plan and partly in cross-section of one form of the apparatus.

Figure II is a wiring diagram of the electrical circuit for the light source.

Figure III is a wiring diagram of the photoelectric compensating circuit.

Figure IV is the wiring diagram for a modification of the photoelectric circuit, as shown in Figure III.

Figure V is the wiring diagram for another modification of the photoelectric circuit, as shown in Figure III.

Similar numerals refer to similar parts throughout the several views.

Referring to Figure I, a metal case 1, with hinged lid (not shown), contains the entire apparatus. The lower part of Figure I is a plan view of the instrument panel 2 of the apparatus. The upper part of Figure I is a diagrammatic cross-section plan view of the optical system of the apparatus, in which fixed tungsten lamp 3 is mounted, with its filament midway between the similar lenses 4 and $4^1$, which are mounted in opposite walls of a ventilated metal lamp housing 5. Light beams 6 and $6^1$ emerge from the lamp housing 5 parallel after passage through the lenses 4 and $4^1$. Twin color filters 7, $7^1$ and 8, $8^1$ are mounted on a movable frame 9 (by any suitable means, not shown) fitted on the outside of the lamp housing 5, so that by pulling or pushing the stop 10 on the outside of the instrument case 1, either pair of filters can be brought into the light beams. The light beams 6 and $6^1$ impinge normally on the sensitive surfaces of two photoelectric cells 11 and $11^1$, which are housed in protecting compartments 12 and $12^1$ having circular entrance apertures 13 and $13^1$. The photoelectric cells 11 and $11^1$ are "Photronic" cells, which are well-known examples of the generative or barrier-layer type of photoelectric cell. An obstructing shutter 14, moved by a screw 15 and head 16, is mounted inside the compartment $12^1$, protruding into the aperture $13^1$, in order to permit slight variation in the amount of light falling on the photoelectric cell $11^1$. A flat-topped table 17 is provided for holding a transparent specimen to intercept the light beam 6.

A pointer galvanometer 18 of the zero-center type, for indicating current balance in the photoelectric circuit, is mounted in panel 2, by any suitable means. A dial 19, calibrated with 0 to 100 uniform divisions, constitutes the reading scale of my apparatus, and is attached to the shaft of a slide-wire potentiometer 25 (Figs. III, IV and V) mounted beneath the panel 2. A voltmeter 20 is for indicating the voltage across lamp 3. The voltage can be manually adjusted to a desired value by means of the knob 21 attached to a rheostat 23 (Fig. II), which is mounted beneath the panel 2. A toggle switch 22 is provided for turning the lamp 3 on and off. Dial 19, voltmeter 20, knob 21, and toggle switch 22 are all mounted by any suitable means on panel 2.

Figure II is a wiring diagram for the lamp circuit, showing the voltmeter 20 connected across the lamp 3, a series rheostat 23 to adjust the lamp voltage, and a switch 22. The leads 24 go to an outside source of potential, which may be a storage battery, transformer, or standard lighting outlet.

Figure III is a wiring diagram for the photoelectric circuit of my apparatus. The photoelectric cell 11, which may be referred to as the "measuring photoelectric cell", and the photoelectric cell 11¹, which may be referred to as the "compensating photoelectric cell", are connected in what is known as an "opposing parallel" arrangement. The ends 27 and 28 of the slide-wire potentiometer 25 are connected to the two terminals of the galvanometer 18, which in turn is connected in parallel with the measuring photoelectric cell 11. One terminal of the measuring photoelectric cell 11 is connected to the terminal of opposite polarity of the compensating photoelectric cell 11¹. The other terminal of the compensating photoelectric cell 11¹ is connected to the variable contact 26 of the slide-wire potentiometer 25, which slide-wire potentiometer carries the calibrated dial 19 (Fig. I). With this arrangement the currents delivered to the galvanometer from the photoelectric cells 11 and 11¹ oppose each other, and the current supplied to the galvanometer from the compensating photoelectric cell 11¹ is capable of being varied from a maximum, when the variable contact 26 is at position 27, to zero, when the variable contact 26 is at position 28. The positions 27 and 28 on the slide-wire 25 correspond, respectively, to readings "100" and "0" on the dial 19 (Fig. I).

In using my apparatus to measure the transmission of light by a specimen, dial 19 is set to read at "100" and the galvanometer 18 adjusted to read at zero. With appropriate identical color filters 7 and 7¹ in place, the lamp 3 is turned on by closing the switch 22 and the lamp voltage, as indicated by the voltmeter 20, adjusted to a selected value by turning the knob 21 of the rheostat 23. If the galvanometer 18 does not then read zero, it is made to do so by adjusting the shutter 14 by turning the head 16 in front of the compensating photoelectric cell 11¹. The circuit is now in balance. The specimen is then placed on the table 17 to intercept light beam 6. This diminishes the intensity of light falling on the measuring photoelectric cell 11, and the needle of the galvanometer 18 deflects, indicating the circuit is unbalanced. Balance is then restored by turning the dial 19 until the needle of the galvanometer 18 returns to zero. The scale of the dial 19 is then read.

Mathematical analysis of the currents and the electromotive forces in the circuit of Figure III, together with experimental tests, indicates that the dial 19 attached to the slide-wire potentiometer 25 will read percent light transmission of a specimen to a close approximation if the electrical resistance of the slide-wire potentiometer 25 is small compared with the internal resistance of the compensating photoelectric cell 11¹.

In some applications of my invention it may not be necessary for the scale of dial 19 to indicate directly the true transmission of a specimen, but merely furnish a reliable but arbitrary scale reading. In such cases the resistance of the slide-wire potentiometer 25 need not be small compared with the internal resistance of the compensating photoelectric cell 11¹, its value being principally determined by the damping requirements of the galvanometer 18 used.

Figure IV shows a modification of the circuit of Figure III, which differs from that of Figure III in having a resistance unit 29 between the end of the slide-wire potentiometer 25 and the galvanometer 18. In cases where the particular slide-wire potentiometer 25 being used has a resistance which is not small compared with the internal resistance of the compensating photoelectric cell 11¹, and the dial scale 19 consequently does not read directly in terms of percent transmission, it may be made to read percent transmission directly to a close approximation by inserting the resistance unit 29, as shown. The magnitude of the resistance unit 29 is not specified, as its value in ohms will depend on the resistance of the particular slide-wire potentiometer 25 and the internal resistance of the particular photoelectric cell 11¹ used in the apparatus.

In Figure V is shown another modification of the circuit of Figure III. A potentiometer 30 is added to the circuit as shown between the galvanometer 18 and the measuring photoelectric cell 11, being connected to the photoelectric cell 11 in the same manner as the slide-wire potentiometer 25 is connected to the compensating photoelectric cell 11¹. The purpose of the potentiometer 30 is to permit slight variations in the photoelectric current supplied to the galvanometer 18 from the measuring photoelectric cell 11, thereby furnishing a means of auxiliary balance of the circuit, and replacing the obstructing shutter 14 (Fig. I) used for the purpose of auxiliary balance when employing the circuit shown in Figure III.

A typical use to which my invention may be applied is in the determination of the color, cleanliness, and grade of rosin. Visual grading of rosin results in disagreements among observers because of the difficulty in evaluating the brightness of the rosin sample, as modified by fine dirt suspended in the rosin, and the natural color of the rosin. The use of my invention for grading rosin eliminates the element of human judgment and at the same time provides a numerical value for the color, and a numerical value for the cleanliness of the rosin. The procedure is to measure, as explained above, the transmission of a seven-eighths inch cube of rosin using a blue-green filter, then measure its transmission using a red filter. The ratio of the blue-green to the red transmission gives an index of the color of the rosin which is independent of the amount of dirt suspended in the sample. The ratio of the blue-green transmission of the sample to the blue-green transmission of a dirt-free rosin of the same color gives an index of the cleanliness of the sample. For example, a given rosin sample might have a blue-green transmission of 21.2 percent and a red transmission of 50.9 percent, as measured by my apparatus. The ratio of the blue-green to the red transmission gives .417 as the color index. The cleanliness of this sample may then be determined by dividing its blue-green transmission of 21.2 percent by 34.2 percent, which is the blue-green transmission of dirt-free rosin having a color index of .417. The ratio of 21.2 percent to 34.2 percent gives .620 as the cleanliness index for this sample, that is, it is 62 percent as bright as it would be if free from dirt.

It is to be understood that my invention is not restricted to the particular form illustrated and described herein. It can be made up in many different ways, the particular mechanical construction and selection of parts being chosen to suit the particular use to which the invention is put. For example, by suitable modification of the optical system, in ways which will readily occur to the user of my invention, reflection factors of specimens could be measured with my invention. Other light sources could be used with my invention, such as a mercury arc, or the light coming from the exit slit of a spectrometer. The word "light" as used here and in the claims is meant to include ultra-violet and infra-red as well as visible radiation. The photoelectric cells may be any kind of photoelectric cell other than the "Photronic" cells used in the form heretofore described.

It is also to be understood that my invention has many useful applications to colorimetry and photometry, other than the application cited here; for example, in the grading and testing of oils, paints, sugar, flour, and other products; in the measurement of turbidity; in the chemical analysis of solutions, as in the determination of phosphorus, carotin, dye concentrations, and the like; and in spectrophotometry.

Photoelectric circuits similar to mine in that they employ a slide-wire potentiometer equipped with a uniform scale to read transmission have been used by others, for example, that described by S. Bodforss in Svensk Kemisk Tidskrift 47, 41 Feb. 1935, and that described by Holven and Gillett in Facts about Sugar, 30, 169, May 1935, in both of which circuits the photoelectric cells are joined in an "opposing series" connection; that is, like terminals of the photoelectric cells are joined, and the galvanometer is in series with the other units. In my invention the photoelectric cells are joined in "opposing parallel" connection, as described, and an apparatus employing my circuit will give nearly double the sensitivity which would be given by the same apparatus employing the "opposing series" circuit. My invention, employing the "opposing parallel" connection in combination with a slide-wire potentiometer with attached scale for reading percent transmission, is new, and is an improvement over apparatus employing "opposing series" connection.

Having thus described my invention, what I claim for Letters Patent is:

1. A photoelectric cell circuit, comprising two photoelectric cells arranged with a zero-center galvanometer and a slide-wire potentiometer in a compensating electrical circuit in which the terminals of one photoelectric cell are adapted to be connected in parallel with the zero-center galvanometer and in parallel with the fixed ends of the slide-wire potentiometer, a terminal of this photoelectric cell adapted to be connected to the terminal of opposite polarity on the other photoelectric cell, the other terminal of the latter photoelectric cell adapted to be connected to the variable contact of the slide-wire potentiometer, and a scale adapted to be attached to the slide-wire potentiometer to indicate the position of the variable contact.

2. A photoelectric cell circuit comprising two photoelectric cells arranged with a zero-center galvanometer and a slide-wire potentiometer in a compensating electrical circuit in which the terminals of one photoelectric cell are adapted to be connected in parallel with the zero-center galvanometer and in parallel with the fixed ends of the slide-wire potentiometer, a terminal of this photoelectric cell adapted to be connected to the terminal of opposite polarity on the other photoelectric cell, the other terminal of the latter photoelectric cell adapted to be connected to the variable contact of the slide-wire potentiometer; a resistance unit adapted to be connected between one end of the slide-wire potentiometer and a terminal of the galvanometer, and a scale adapted to be attached to the slide-wire potentiometer to indicate the position of the variable contact.

3. A photoelectric cell circuit, comprising two photoelectric cells arranged with a zero-center galvanometer and two slide-wire potentiometers in a compensating electrical circuit in which the potentiometers are adapted to be connected in parallel with each other and in parallel with the zero-center galvanometer, a terminal of one photoelectric cell adapted to be connected to the terminal of opposite polarity on the other photoelectric cell and to one set of terminals common to the two potentiometers and the zero-center galvanometer, the other terminal of the former photoelectric cell being adapted to be connected to the variable contact of one potentiometer, the other terminal of the latter photoelectric cell adapted to be connected to the variable contact of the other potentiometer, and scales adapted to be attached to at least one of the slide-wire potentiometers to indicate the position of the variable contact.

4. In a photoelectric cell circuit according to claim 1, the slide-wire potentiometer adapted to have an electrical resistance small in comparison with those of the photoelectric cell.

5. In a photoelectric cell circuit according to claim 3, at least one of the slide-wire potentiometers adapted to have an electrical resistance small in comparison with those of the photoelectric cells.

6. In a compensating photoelectric cell circuit containing two photoelectric cells, a zero-center galvanometer and one or more slide-wire potentiometers, in which the electrical resistance of at least one of the potentiometers is small in comparison with those of the photoelectric cells, a uniform scale calibrated from 0 to 100 to be attached to at least one of the slide-wire potentiometers to indicate the fractional position of the variable contact.

BROOKS A. BRICE.